United States Patent [19]
Bostedo et al.

[11] Patent Number: 6,164,312
[45] Date of Patent: Dec. 26, 2000

[54] PURGE VALVE

[75] Inventors: Robert G. Bostedo, Pittsburgh; Gregory L. Johnston, Tarentum; Robert D. Dimsa, Elizabeth; Daniel G. Scott, Pittsburgh; Ralph Santoro, Jr., New Kensington, all of Pa.

[73] Assignee: Westinghouse Air Brake Company, Wilmerding, Pa.

[21] Appl. No.: 09/379,884

[22] Filed: Aug. 24, 1999

[51] Int. Cl.[7] ....................................................... F16K 7/12
[52] U.S. Cl. .............................................. 137/204; 137/510
[58] Field of Search ..................................... 137/203, 204, 137/510

[56] References Cited

U.S. PATENT DOCUMENTS 3,659,625  5/1972  Coiner et al. ............................ 137/204

*Primary Examiner*—Gerald A. Michalsky
*Attorney, Agent, or Firm*—James Ray & Associates

[57] ABSTRACT

The invention is a valve for expelling a liquid contaminant from a gas in a conduit. It is used for a conduit with a pressure subject to variations in time. The valve has a housing containing a diaphragm with a control chamber on one side of the diaphragm and an exhaust passage on the other side. A valve seat surrounds the exhaust passage. A spring presses the diaphragm against the valve seat so that the valve is normally closed and an annular chamber surrounds the exhaust passage. A low impedance discharge passage is connected to the annular chamber and to the conduit. A high impedance control passage is connected to the control chamber and is either connected to the discharge passage or to the conduit. When the conduit pressure remains constant in time, the pressure in the control chamber equilibrates with it so that a net pressure force on the diaphragm plus the spring force presses the diaphragm against the valve seat so that the valve is closed. When the conduit pressure is zero, the spring keeps the valve closed. When the pressure in the conduit increases rapidly, the pressure in the annular chamber rises faster than the pressure in the control chamber so that the net pressure force on the diaphragm becomes directed away from the valve seat and overcomes the spring force so that the diaphragm unseats and gas containing the contaminant liquid is purged from the valve.

20 Claims, 4 Drawing Sheets

PURGE VALVE

CROSS-REFERENCE TO RELATED APPLICATIONS

The present invention is closely related to the following copending patent application: Normally Open Purge Valve, filed the same date as the present application, Aug. 24, 1999, and which has Ser. No. 09/379,874. The above-referenced patent application is assigned to the assignee of the present invention. Its teachings are incorporated herein by reference thereto.

FIELD OF THE INVENTION

The present invention relates, in general, to a valve for purging contaminant liquids from a pressurized gas conduit and, more particularly, the instant invention relates to a valve for purging contaminant liquids from a railway vehicle brake air line which is subject to pressure variations.

BACKGROUND OF THE INVENTION

The invention specifically applies to the independent brake line of a locomotive. More specifically, it applies to the 20 line in the EPIC® 3102 braking system. In general, it applies to removal of liquid contaminants from a gas conduit which is normally at zero pressure or at a steady positive pressure and which at times is subject to pressure variations.

The independent brake system of a locomotive operates independently of the main airbrake system that includes the brake air line which is connected between all the railway vehicles in a consist of coupled railway vehicles. The independent brake system applies brakes only in the locomotive. It is used, for example, when a locomotive is not connected to other railway cars, but is moved independently within a switchyard or a maintenance facility.

The independent brake system of a locomotive has a brake air line which is pressurized to apply brakes in the locomotive and is depressurized to release brakes. The independent brake system works in a manner exactly opposite to the main airbrake system of a train, in which the brake line is pressurized to release brakes and depressurized to apply brakes.

In addition to its use for controlling an isolated locomotive in a switchyard or maintenance facility, the independent brake system is also used on other occasions when it is desired to apply brakes in the locomotive but not in the other railway cars. For example, it is generally desirable for an engineer to place all the cars in a train in either a tension mode, or in a compression mode to reduce impact forces on couplers and draft gears due to relative motion of coupled cars. To place a train in a compression mode, as for example, prior to descending a grade, an engineer may retard the locomotive using the independent brake system so that the line of cars compresses against the locomotive.

The EPIC® 3102 Braking system uses transducers to measure the pressure in the 20 line. Difficulty has been experienced during winter weather conditions due to freezing of moisture in the 20 line. The transducers which measure pressure in the 20 line may freeze, or the fluid pathways to the transducers may become blocked with ice. Accordingly, it is necessary to remove condensed moisture from the 20 line. The 20 line may also have other fluid contaminants such as oil droplets and it is desirable to purge these from the system.

SUMMARY OF THE INVENTION

In one aspect, the invention provides a purge valve for expelling a liquid contaminant from a gas in a fluid conduit. It is for a conduit which normally has zero pressure relative to the ambient atmosphere, or a constant positive pressure, but which at times varies in time. The valve has a housing and a diaphragm mounted within the housing. A control chamber is disposed on a first side of the diaphragm and an exhaust passage is located on a second side of the diaphragm. A valve seat surrounds the upstream end of the exhaust passage and is positioned so that the diaphragm may seal against the valve seat.

A spring is disposed within the control chamber on the first side of the diaphragm to provide a spring force on the diaphragm to press it against the valve seat so that the valve is normally closed. An annular chamber is located on the second side of the diaphragm surrounding the exhaust passage. The annular chamber is open to the exhaust passage when the diaphragm is not seated against the valve seat. A relatively low impedance discharge flow path is connected to the annular chamber and is connectable to the fluid conduit. A relatively high impedance control flow path is connected to the control chamber and either connected to the low impedance discharge flow path or connectable to the fluid conduit. When the valve is connected to the fluid conduit and the first pressure remains constant in time, the pressure in the control chamber becomes about equal to the pressure in the fluid conduit so that a net pressure force on the diaphragm added to the spring force presses the diaphragm against the valve seat so that the valve is closed. If the pressure in the conduit is zero relative to the atmosphere, the spring force alone keeps the valve closed. When the pressure in the conduit increases at a sufficiently rapid rate, the pressure in the annular chamber rises faster than the pressure in the control chamber so that the net pressure force on the diaphragm becomes directed away from the valve seat and toward the control chamber and is sufficient in magnitude to overcome the spring force so that the diaphragm becomes unseated and gas containing the contaminant liquid is purged from the valve.

In another aspect, the invention provides a purge valve arrangement for expelling a liquid contaminant from a gas in a fluid conduit. It is for a conduit which normally has zero pressure, or a constant positive pressure, but which, on certain occasions, varies in time. The valve has a housing and a diaphragm mounted within the housing. A control chamber is positioned on a first side of the diaphragm and an exhaust passage is located on a second side of the diaphragm. A valve seat surrounds the upstream end of the exhaust passage and is positioned so that the diaphragm may seal thereagainst.

A spring is disposed within the control chamber on the first side of the diaphragm to provide a spring force on the diaphragm to press it against the valve seat so that the valve is normally closed. An annular chamber is formed on the second side of the diaphragm, surrounding the exhaust passage. The annular chamber is open to the exhaust passage when the diaphragm is not seated against the valve seat. A relatively low impedance discharge flow path is connected to the annular chamber and is connectable to the fluid conduit. The arrangement includes a liquid separator having a wet connection point and a relatively dry connection point, the liquid separator connectable to the fluid conduit at the wet connection point of the liquid separator. A relatively high impedance control flow path is connected to the control chamber and to the relatively dry connection point of the liquid separator. When the valve is connected to the fluid conduit and the first pressure remains constant in time the pressure in the control chamber becomes about equal to the pressure in the fluid conduit so that a net pressure force on the diaphragm added to the spring force presses the diaphragm against the valve seat. In this manner the valve is closed. When the pressure in the conduit increases at a sufficiently rapid rate the pressure in the annular chamber rises faster than the pressure in the control chamber so that the net pressure force on the diaphragm becomes directed away from the valve seat and toward the control chamber and is sufficient in magnitude to overcome the spring force so that the diaphragm becomes unseated and gas containing the contaminant liquid is purged from the valve.

OBJECTS OF THE INVENTION

It is, therefore, one of the primary objects of the present invention to provide a valve for eliminating liquid contaminants from a conduit which normally has a constant pressure, including zero, and which is subject to pressure variations.

Another object of the present invention is to provide a valve for a conduit which at times contains a pressurized gas and wherein the valve is closed whenever the pressure in the conduit is stable and opens during a transient event in which the pressure is increasing, so that liquid contaminants are purged from the valve during that transient event.

It is a further object of the present invention to provide a valve for a conduit which at times contains a pressurized gas and wherein the valve is closed whenever the conduit has a stable pressure to prevent loss of gas from the conduit.

It is an additional object of the present invention to provide a valve for a conduit, which at times contains a pressurized gas contaminated with water, and which has transducers for measuring pressure in which the valve removes water so that the transducers or pathways to the transducers do not freeze.

Another object of the present invention is to provide a valve arrangement for eliminating liquid contaminants from a fluid conduit which at times contains a pressurized gas wherein the arrangement expels liquid from a point on the conduit which has a relatively high amount of the liquid contaminant in which control of the valve includes the use of gas from a relatively dry point on a liquid separator which is connected to the conduit.

It is an additional object of the present invention to provide a valve arrangement for eliminating liquid contaminants from a fluid conduit which at times carries a pressurized gas and in which the valve arrangement does not require frequent maintenance.

It is a further object of the present invention to provide a valve arrangement for eliminating liquid contaminants from a fluid conduit which at times carries a pressurized gas wherein the valve arrangement functions automatically to drain liquid contaminants whenever the pressure in the conduit is increasing at a sufficiently rapid rate.

Still another object of the present invention is to provide a valve for removing water from the independent brake line of a locomotive in which the valve is closed whenever the independent brake line has zero pressure and the valve opens whenever the independent brake line pressure is increasing.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
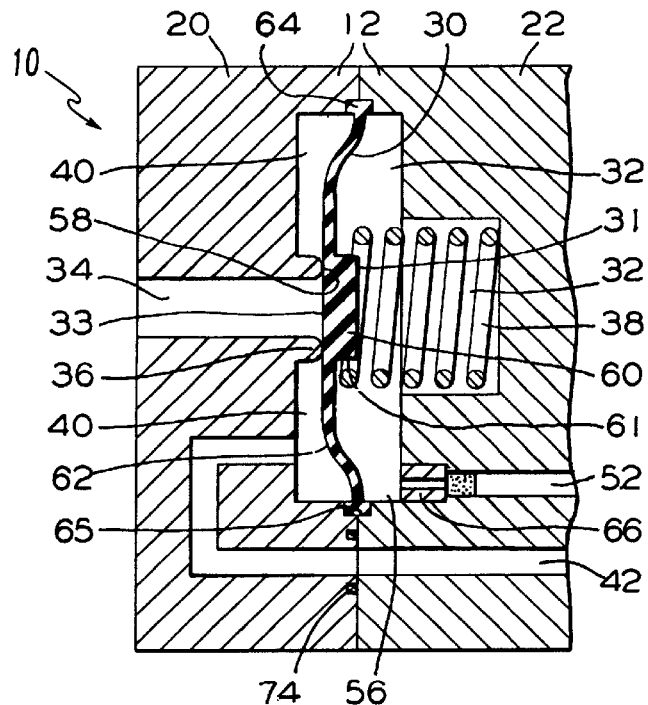
FIG. 1 is a cross sectional view of a valve according to one presently preferred embodiment of the invention, the valve illustrated in a closed position.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

Attention is now directed to FIG. 1 which shows a median section of a valve, generally designated 10, which is the presently preferred embodiment of this invention. Valve 10 includes a housing 12 consisting of a first housing portion 22 and a second housing portion 20. The second housing portion 20, preferably, is removable so that valve 10 may be serviced. Valve 10 has a diaphragm 30 with a control chamber 32 on a first side thereof. A spring 38 is positioned in control chamber 32. Such spring 38 urges the diaphragm 30 towards a closed position against valve seat 36 which surrounds exhaust passage 34 so that valve 10 is normally closed.

Valve 10 has a low impedance discharge flow path 42 and a high simpedance control flow path 52, both for connection to a conduit 50 (shown in FIGS. 4 and 7) from which liquid is to be purged. Low impedance discharge flow path 42 provides rapid communication of pressure from conduit 50 to annular chamber 40 on second side 33 of diaphragm 30. Annular chamber 40 surrounds valve seat 36 and exhaust passage 34. High impedance control flow path 52 has a flow restriction 66 and is connected to control chamber 32. High impedance control flow path 52 provides delayed communication of pressure from conduit 50 to control chamber 32. The connection of high impedance control flow path 52 to control chamber 32 is preferably made at the lowest point 56 of control chamber 32 to prevent liquid contaminants from pooling in control chamber 32.

FIG. 1 shows valve 10 in a closed position. This is the position it assumes when the pressure in conduit 50 is constant in time. For the case of zero pressure in conduit the 50, spring 38 urges diaphragm 30 against valve seat 36 so the valve 10 is closed. For the case of a constant positive pressure in conduit 50, the control chamber 32 has the same pressure as the conduit 50 and annular chamber 40 has that pressure. Since the first side 31 of diaphragm 30 on the control chamber side has a greater area than the portion of the diaphragm 30 adjacent the annular chamber 40, the net pressure force on diaphragm 30 is directed towards valve seat 36. Likewise, spring 38 presses diaphragm 30 in the same direction, so valve 10 is closed, as shown in FIG. 1.

Figure 2:
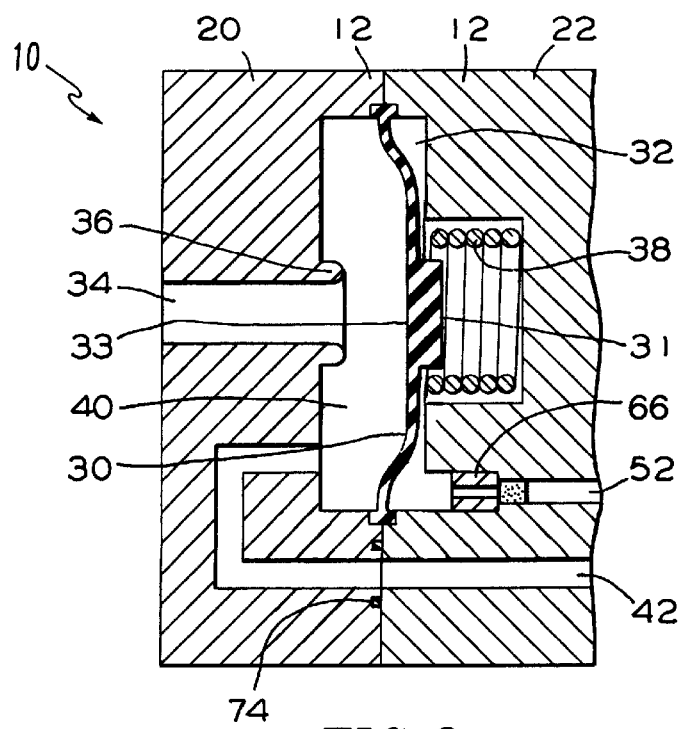
FIG. 2 is a section of the valve of the valve shown in FIG. 1, in an open position which occurs during positive pressure transients.

FIG. 2 shows valve 10 in an open position. In this case, diaphragm 30 is pressed away from valve seat 36. This occurs when the pressure in the conduit 50 rises at a sufficiently rapid rate. As the pressure in annular chamber 40 rises faster than the pressure in control chamber 32, due to rapid communication of pressure through low impedance discharge flow path 42, the force on diaphragm 30 presses it away from valve seat 36 and valve 10 is opened. The utility of valve 10 is shown, for example, when it is connected to the independent brake line of a locomotive. In this application, when the brakes are applied, the pressure in the independent brake line increases rapidly and valve 10 opens and during a brief time, air and any contaminant liquids are purged through exhaust passage 34.

Figure 6:
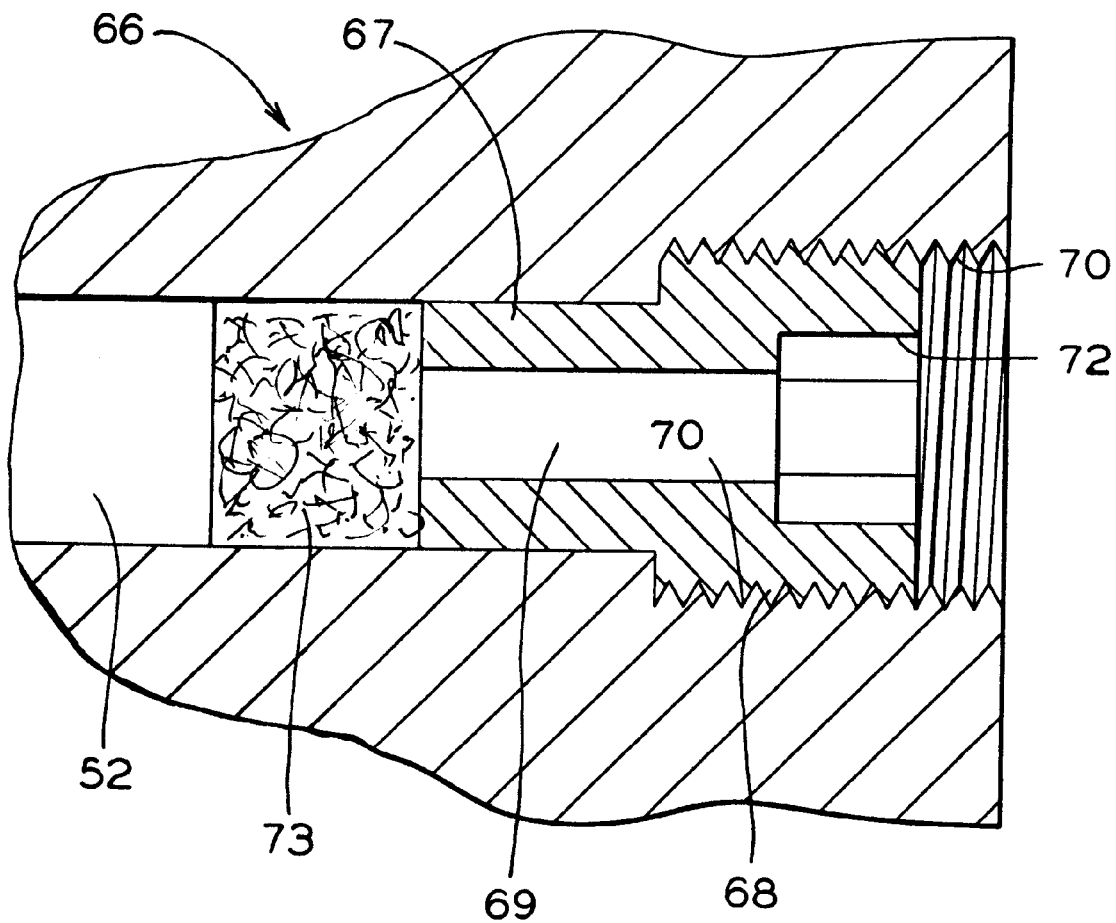
FIG. 6 shows a flow restriction used in the high impedance control flow path.

It is preferred that the flow restriction 66 in high impedance flowpath 52, shown in FIG. 6, be removable for servicing. It is recommended that flow restriction 66 have a threaded exterior 68 to engage internally threaded portion 70 of high impedance control flowpath 52. Flow restriction 66 should include a filter 73 to prevent restricted passage 69 from being blocked by debris. A socket 72 is recommended for a hexagonal wrench so that flow restriction 66 may be removed and replaced.

Diaphragm 30 preferably has a relatively stiff central portion 60 and a relatively flexible annular portion 62. It is preferred that the stiff central portion 60 protrude on the first side 31 of diaphragm 30 and have an outer diameter 61 sized to fit within spring 38 to provide a positioning constraint for spring 38. In the presently preferred embodiment, diaphragm 30 further includes a circumferential ridge 64 which provides a seal between first housing portion 22 and second housing portion 20. Ridge 64 also serves to position the diaphragm 30. Ridge 64 is received within a groove 65 formed in housing 12. Preferably, diaphragm 30 is clamped between the first housing portion 22 and the second housing portion 20.

A seal around the low impedance discharge flow path 42 is preferably provided by an O-ring 74 disposed between first housing portion 22 and second housing portion 20. Valve seat 36, preferably, is formed as an annular ridge having a smooth convex surface 58 against which diaphragm 30 seats.

Figure 3:
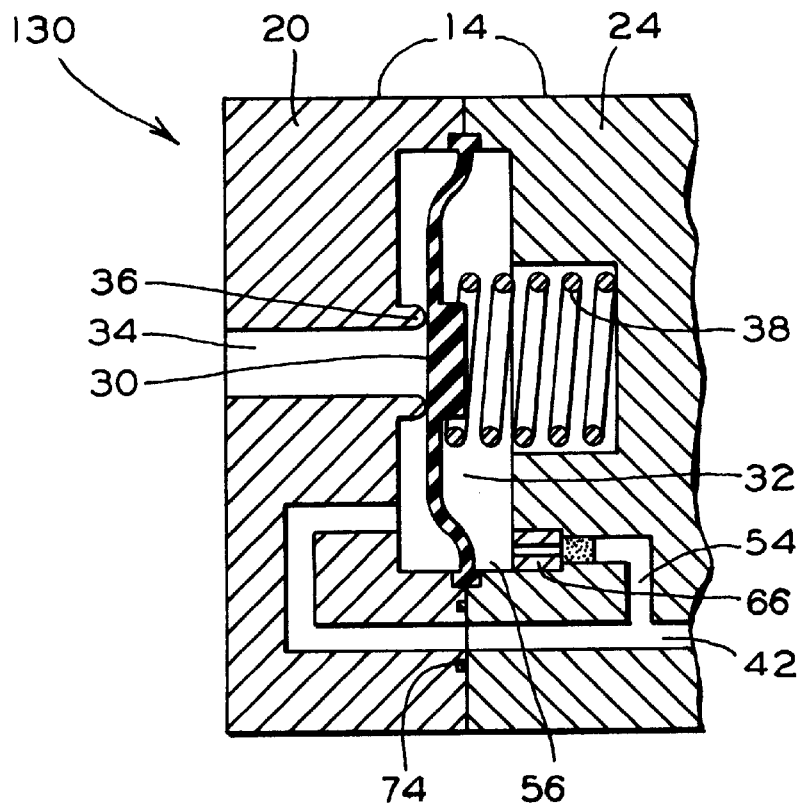
FIG. 3 is a cross sectional view of an alternative embodiment which has a high impedance control flow path connected to a relatively low impedance discharge flow path.

FIG. 3 illustrates an alternative embodiment of a valve, generally designated 130, shown in a closed position. Valve 130 includes a housing 14 which has a first housing portion 24 and a second housing portion 20. A high impedance control flow path 54 is connected to a low impedance discharge flow path 42. In other respects the valve 130 is similar to valve 10. It has a diaphragm 30, spring 38, valve seat 36 and exhaust passage 34. Valve 130, like valve 10, is normally closed. Like valve 10, it opens briefly during pressure rise transients to purge contaminant liquids.

Figure 4:
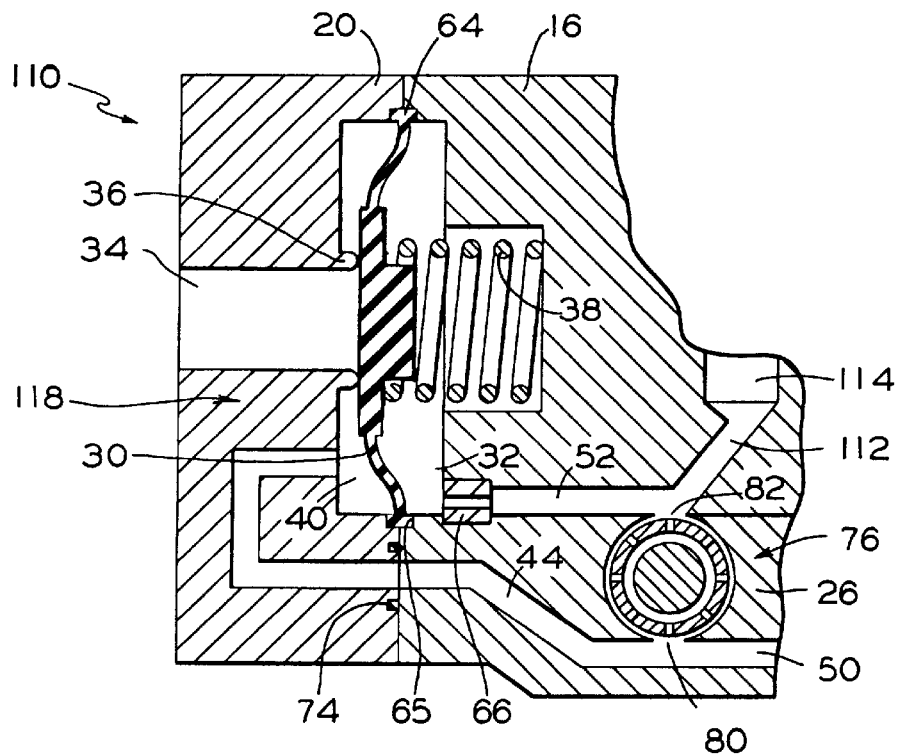
FIG. 4 is a schematic of a purge valve arrangement, according to this invention, which includes a liquid separator and a transducer connection.
Figure 5:
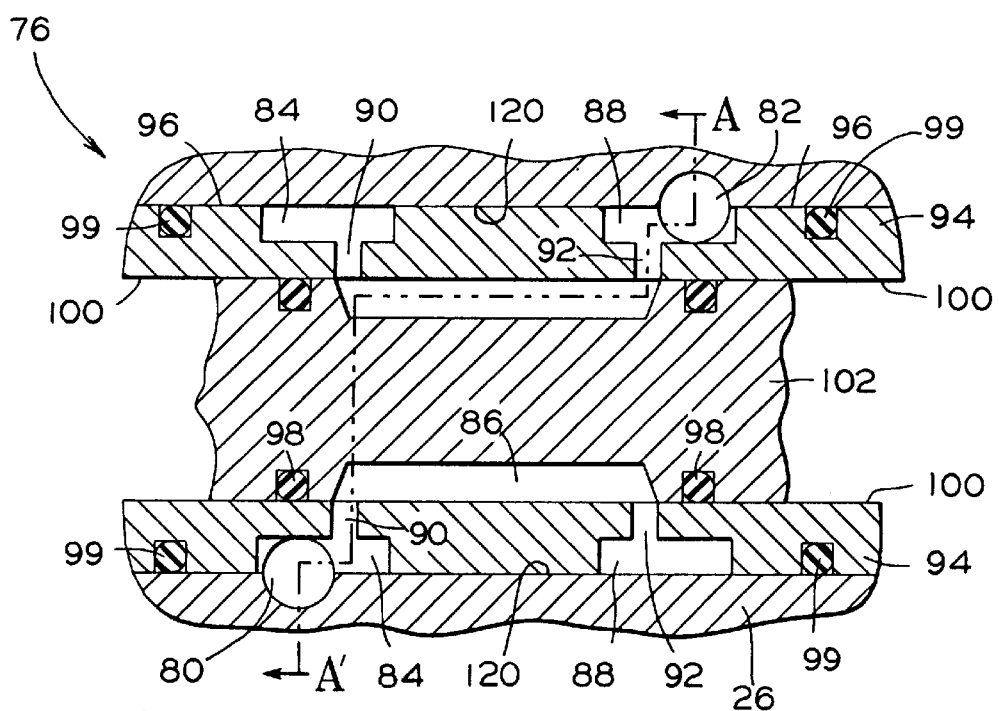
FIG. 5 is a longitudinal section of the liquid separator shown in FIG. 4.

Attention is now directed to FIGS. 4 and 5 which illustrate an alternative embodiment which is a purge valve arrangement, generally designated 110, for expelling a liquid contaminant from a fluid conduit 50. Fluid conduit 50 carries a gas having a first pressure and containing the liquid contaminant. The first pressure is positive or zero and is subject to variations in time. The valve arrangement 110 has a valve portion 118 which is similar to valve 10 shown in FIGS. 1 and 2, and other parts identical to those in valve 10. Some components of valve portion 118 are best seen in FIG. 1, to which attention is also directed. The valve arrangement 110 has a housing 16 with a diaphragm 30 mounted therein.

A control chamber 32 is located on a first side 31 of the diaphragm 30 and an exhaust passage 34 is disposed on a second side 33 of the diaphragm 30. A valve seat 36 surrounds the upstream end of the exhaust passage 34 and is positioned so that the diaphragm 30 seals against the valve seat 36.

A spring 38 is positioned in the control chamber 32 on the first side of the diaphragm 30 to provide a spring force on the diaphragm 30 to urge it against the valve seat 36 so that the valve 118 is normally closed. An annular chamber 40 is disposed on the second side 33 of the diaphragm 30. The annular chamber 40 surrounds the valve seat 36 and the exhaust passage 34. The annular chamber 40 is open to the exhaust passage 34 when the diaphragm 30 is unseated from the valve seat 36.

A relatively low impedance discharge flow path 44 is connected to the annular chamber 40 and to the fluid conduit 50.

The arrangement includes a liquid separator 76 having a wet connection point 80 and a relatively dry connection point 82. The liquid separator 76 is connected to the fluid conduit 50 at the wet connection point 80 of the liquid separator 76. The liquid separator 76 permits equilibration of gas pressure between the wet connection point 80 and the relatively dry connection point 82, while permitting the liquid contaminant to flow downward from the relatively dry connection point 82 to the wet connection point 80.

A relatively high impedance control flow path 52 is connected to the control chamber 32 and to the relatively dry connection point 82 of the liquid separator 76 to convey pressure from fluid conduit 50 to control chamber 32.

When the valve arrangement 110 is connected to the fluid conduit 50 and the first pressure remains constant in time, pressure communicated through the relatively high impedance control flow path 52 causes a second pressure in the control chamber 32 to become about equal to the first pressure in the fluid conduit 50. In this situation the net pressure force on the diaphragm 30 added to the force due to spring 38 urges the diaphragm 30 against the valve seat 36 so that the valve portion 118 is closed.

When the first pressure in fluid conduit 50 increases at a sufficiently rapid rate, the third pressure in the annular chamber 40 rises faster than the second pressure in the control chamber 32 due to the rapid equilibration of pressure through low impedance discharge flow path 44. The net pressure force on the diaphragm 30 then becomes directed away from the valve seat 36 and toward the control chamber 32 and is sufficient in magnitude to overcome the biasing force exerted by spring 38. When this occurs the diaphragm 30 becomes unseated and gas containing the contaminant liquid is purged from the valve 118.

It is preferred that the high impedance control flow path 52 be connected to the control chamber 32 at about the lowest portion 56 thereof to prevent pooling of the contaminant liquid in control chamber 32. The valve seat 36, preferably, is formed as an annular ridge surrounding the upstream end of the exhaust passage 34. It is preferred that it be formed with a smooth convex surface 58 on a side toward the diaphragm 30.

The diaphragm 30, preferably, includes a relatively stiff central portion 60 and a relatively flexible annular outer portion 62. It is preferred that the stiff central portion 60 protrude on the first side 31 of diaphragm 30 and have an outer diameter 61 sized to fit within the spring 38, thereby providing a positioning constraint for the spring 38.

It is preferred that the diaphragm 30 have a circumferential ridge 64 for sealing inside a circumferential groove 65 formed in the housing 16. Diaphragm 30, preferably, is clamped between a first portion 26 of the housing 16 and a second portion 20 of the housing 16. The second portion 20 of the housing 16 should be removable from the first portion 26 so that the valve 118 may be serviced.

The relatively high impedance control flow path 52, preferably, includes a removable flow restriction 66. Flow restriction 66, preferably, has a threaded exterior portion 68 for engagement with an internally threaded portion 70 of the control flow path 52.

The purge valve arrangement 110 preferably has an attachment site for a transducer 114, the attachment site 114 either connected to the dry connection point 82 on the liquid separator 76 or to the high impedance control flow path 52. The relatively dry connection point 82 on the liquid separator 76 should be at a greater elevation than the wet connection point 80 on the liquid separator 76.

Liquid separator 76 includes three annular separation chambers 84, 86 and 88, best seen in FIG. 5. Each of the three annular separation chambers is, preferably, oriented in a substantially vertical plane, the wet connection point 80 being at a low point on a first one 84 of the three annular separation chambers. The relatively dry connection point 82 is located at a high point on a third one 88 of the three annular separation chambers. The first annular separation chamber 84 is connected to the second annular separation chamber 86 through a first plurality of relatively small passages 90. Likewise the second annular separation chamber 86 is connected to the third annular separation chamber 88 through a second plurality of relatively small passages 92. The three annular separation chambers 84, 86 and 88 in cooperation with the first plurality of relatively small passages 90 and the second plurality of relatively small passages 92 permit downward flow of contaminant liquid from the relatively dry connection point 82 to the wet connection point 80, while permitting gas pressure to equilibrate between such wet connection point 80 and such relatively dry connection point 82. Splashing of the liquid contaminant due to flow past wet connection point 80 is prevented from reaching the relatively dry connection point 82 by this arrangement.

The second annular separation chamber 86, preferably, has a lesser diameter than the first annular separation chamber 84 and a lesser diameter than the third annular separation chamber 88. In this case, each of the first plurality of relatively small passages 90 preferably is oriented substantially radially and each of the second plurality of relatively small passages 92 preferably is oriented substantially radially.

The first annular separation chamber 84 and the third annular separation chamber 88 preferably are formed in an exterior surface 96 of a bushing 94 disposed within a substantially horizontal bore 120 in the housing 16. The second annular separation chamber 86, preferably, is formed in an exterior surface 104 of a core 102 disposed within an inner surface 100 of the bushing 94. Each of the first plurality of relatively small passages 90 preferably is formed through the bushing 94 from the first chamber 84 to the inner surface 100 of the bushing 94 to connect to the second chamber 86. Each of the second plurality of relatively small passages 92 is formed through the bushing 94 from the third chamber 88 to the inner surface 100 of the bushing 94 to connect to the second chamber 86. The passages 90 and 92 are formable by drilling radially inward through the bushing 94. O-rings 98 and 99 seal between the exterior surface 96 of bushing 94 and bore 120.

FIG. 6 shows a flow restriction 66 for the high impedance control flow path 52. It has a body 67 having a restricted flow passage 69 and a filter 73. Flow restriction 66 has external threads 68 for engaging internal threaded portion 70 of such high impedance control flow path 52.

Figure 7:
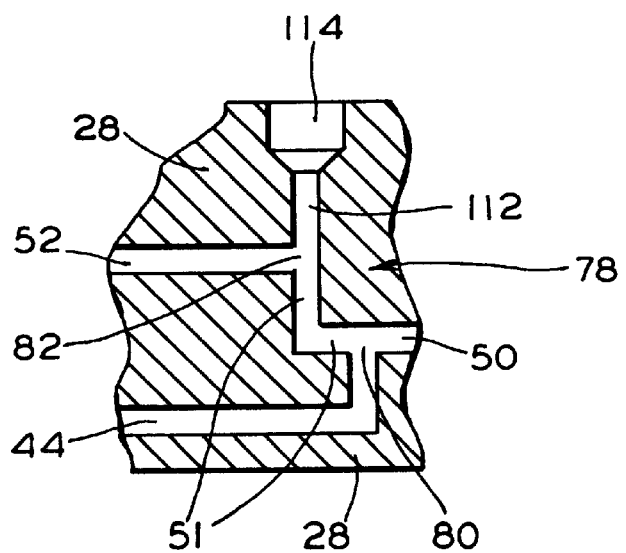
FIG. 7 is a schematic of an alternative liquid separator.

FIG. 7 shows an alternative liquid separator 78 formed within the first housing portion 28. The liquid separator 78 consists of a passage 51 positioned between the wet connection point 80 and the relatively dry connection point 82. The relatively dry connection point 82 should be at a greater elevation than the wet connection point 80. The conduit 50 and the low impedance discharge flow path 44 are connected to wet connection point 80. The relatively high impedance control flow path 52 is connected to the relatively dry connection point 82. The transducer passage 112 leading to transducer attachment 114 is connected to such relatively dry connection point 82. Conduit 50, passage 51 of liquid separator 78, low impedance discharge flow path 44, relatively high impedance control flow path 52 and transducer passage 112 are all formed within such first housing portion 28.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A purge valve for expelling a liquid contaminant from a fluid conduit which carries a gas containing such liquid contaminant and having a first pressure, such first pressure being one of positive and zero, and subject to variations in time, said valve comprising:

(a) a housing;

(b) a diaphragm mounted within said housing;

(c) a control chamber on a first side of said diaphragm;

(d) an exhaust passage on a second side of said diaphragm;

(e) a valve seat surrounding an upstream end of said exhaust passage, said valve seat positioned so that said diaphragm may seal against said valve seat;

(f) a spring disposed within said control chamber on said first side of said diaphragm to provide a spring force on said diaphragm to press it against said valve seat so that said valve is normally closed;

(g) an annular chamber on said second side of said diaphragm, said annular chamber surrounding said exhaust passage, said annular chamber open to said exhaust passage when said diaphragm is unseated from said valve seat;

(h) a relatively low impedance discharge flow path connected to said annular chamber, said relatively low impedance discharge flow path connectable to such fluid conduit;

(i) a relatively high impedance control flow path connected to said control chamber and at least one of connected to said low impedance discharge flow path and connectable to such fluid conduit, so that when said valve is connected to such fluid conduit and such first pressure is zero said spring force presses said diaphragm against said valve seat so that said valve is closed and so that when said valve is connected to such fluid conduit and such first pressure remains constant in time a second pressure in said control chamber becomes about equal to such first pressure in such fluid conduit so that a net pressure force on said diaphragm added to said spring force presses said diaphragm against said valve seat so that said valve is closed, and when such first pressure increases at a sufficiently rapid rate a third pressure in said annular chamber rises faster than said second pressure in said control chamber so that said net pressure force on said diaphragm becomes directed away from said valve seat and toward said control chamber and is sufficient in magnitude to overcome said spring force so that said diaphragm becomes unseated and gas containing said contaminant liquid is purged from said valve.

2. A purge valve according to claim 1 wherein said high impedance control flow path is connected to said control chamber at about the lowest portion thereof.

3. A purge valve according to claim 1 wherein said valve seat is formed as an annular ridge surrounding said upstream end of said exhaust passage.

4. A purge valve according to claim 3 wherein said annular ridge has a smooth convex surface on a side toward said diaphragm.

5. A purge valve according to claim 1 wherein said diaphragm has a relatively stiff central portion and a relatively flexible portion surrounding said central portion.

6. A purge valve according to claim 5 wherein said relatively stiff central portion has a portion thereof protruding on said first side of said diaphragm, said protruding portion having an outer diameter sized to fit within said spring thereby providing positioning constraints for said spring.

7. A purge valve according to claim 1 wherein said diaphragm has a circumferential ridge for sealing inside a circumferential groove formed in said housing.

8. A purge valve according to claim 7 wherein said diaphragm is clamped between a first portion of said housing and a second portion of said housing.

9. A purge valve according to claim 8 wherein said second portion of said housing is removable from said first portion of said housing so that said valve may be serviced.

10. A purge valve according to claim 1 wherein said relatively high impedance control flow path includes a removable flow restriction disposed therein.

11. A purge valve according to claim 10 wherein said removable flow restriction has a threaded exterior portion for engagement with an internally threaded portion of said control flow path.

12. A purge valve arrangement for expelling a liquid contaminant from a fluid conduit which carries a gas containing such liquid contaminant and having a first pressure, such first pressure being one of positive and zero, and subject to variations in time, said valve arrangement comprising:

(a) a housing;
(b) a diaphragm mounted within said housing;
(c) a control chamber on a first side of said diaphragm;
(d) an exhaust passage on a second side of said diaphragm;
(e) a valve seat surrounding an upstream end of said exhaust passage, said valve seat positioned so that said diaphragm may seal against said valve seat;
(f) a spring disposed within said control chamber on said first side of said diaphragm to provide a spring force on said diaphragm to press it against said valve seat so that said valve is normally closed;
(g) an annular chamber on said second side of said diaphragm surrounding said exhaust passage, said annular chamber open to said exhaust passage when said diaphragm is unseated from said valve seat;
(h) a relatively low impedance discharge flow path connected to said annular chamber, said relatively low impedance discharge flow path connectable to such fluid conduit;
(i) a liquid separator having a wet connection point and a relatively dry connection point, said liquid separator connectable to such fluid conduit at said wet connection point of said liquid separator;
(j) a relatively high impedance control flow path connected to said control chamber, said relatively high impedance control flow path connected to said relatively dry connection point of said liquid separator, so that when said valve is connected to such fluid conduit and such first pressure remains constant in time, a second pressure in said control chamber becomes about equal to such first pressure in such fluid conduit so that a net pressure force on said diaphragm added to said spring force presses said diaphragm against said valve seat so that said valve is closed, and so that when such first pressure increases at a sufficiently rapid rate said third pressure in said annular chamber rises faster than said second pressure in said control chamber so that said net pressure force on said diaphragm becomes directed away from said valve seat and toward said control chamber and is sufficient in magnitude to overcome said spring force so that said diaphragm becomes unseated and gas containing said contaminant liquid is purged from said valve.

13. A purge valve arrangement according to claim 12 wherein said high impedance control flow path is connected to said control chamber at about the lowest portion thereof.

14. A purge valve arrangement according to claim 13 wherein said liquid separator includes three annular separation chambers, each one of said three annular separation chambers oriented in a substantially vertical plane, said wet connection point being at a low point on a first of said three annular separation chambers, said relatively dry connection point being at a high point on a third one of said three annular separation chambers, said first of said three annular separation chambers being connected to a second of said three annular separation chambers through a first plurality of relatively small passages, said second of said three annular separation chambers being connected to said third one of said three annular separation chambers through a second plurality of relatively small passages.

15. A purge valve arrangement according to claim 14 wherein said second of said three annular separation chambers has a lesser diameter than said first of said three annular separation chambers and a lesser diameter than said third one of said three annular separation chambers and wherein each of said first plurality of relatively small passages is oriented substantially radially and wherein each of said second plurality of relatively small passages is oriented substantially radially.

16. A purge valve arrangement according to claim 15 wherein said first of said three annular separation chambers and said third one of said three annular separation chambers is formed in an exterior surface of a bushing which is disposed within an about horizontal bore in said housing, said second of said three annular separation chambers being formed in an exterior surface of a core disposed within an inner surface of said bushing and each of said first plurality of relatively small passages is formed through said bushing from said first of said three annular separation chambers to said inner surface of said bushing to connect to said second of said three annular separation chambers and wherein each of said second plurality of relatively small passages is formed through said bushing from said third one of said three annular separation chambers to said inner surface of said bushing to connect to said second of said three annular separation chambers.

17. A purge valve arrangement according to claim 12 wherein said diaphragm has a relatively stiff central portion and a relatively flexible portion surrounding said central portion.

18. A purge valve according to claim 17 wherein said relatively stiff central portion has a protruding portion thereof disposed within said spring, said protruding portion having an outer diameter sized to fit within an inside diameter of said spring thereby providing positioning constraints for said spring.

19. A purge valve arrangement according to claim 12 wherein said relatively dry connection point on said liquid separator is at a greater elevation than said wet connection point on said liquid separator.

20. A purge valve arrangement according to claim 19 wherein said valve arrangement further includes an attachment site for a transducer, said attachment site being connected to at least one of said dry connection point on said liquid separator and said high impedance control flow path.

* * * * *